(No Model.)

E. B. C. WILLISON.
VEHICLE BRAKE.

No. 307,367. Patented Oct. 28, 1884.

WITNESSES
J. W. Reynolds
Edward E. Ellis

INVENTOR
E. B. C. Willison
By O. E. Duffy
ATTORNEY

UNITED STATES PATENT OFFICE.

EDWIN B. C. WILLISON, OF WIND RIDGE, PENNSYLVANIA.

VEHICLE-BRAKE.

SPECIFICATION forming part of Letters Patent No. 307,367, dated October 28, 1884.

Application filed June 28, 1884. (No model.)

*To all whom it may concern:*

Be it known that I, EDWIN B. C. WILLISON, of Wind Ridge, in the county of Greene, and State of Pennsylvania, have invented certain new and useful Improvements in Brake-Lock Mechanism for Vehicles; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to mechanism for automatically adjusting the brake-blocks of wagons and other vehicles, to cause them to bear with greater or less pressure upon the wheels, whereby the speed of such wagons or vehicles, in the descent of inclines, and at other times desired, can be checked at will by the operator. It has for its object to provide means for locking or retaining the brake at whatever position it may be drawn, thereby obviating the necessity of any physical exertion on the part of the operator, and also to simplify the construction of parts.

With these ends in view the invention consists, substantially, in the devices as constructed, and in the particular combinations of parts hereinafter described, and pointed out in the claim.

Figure 1:
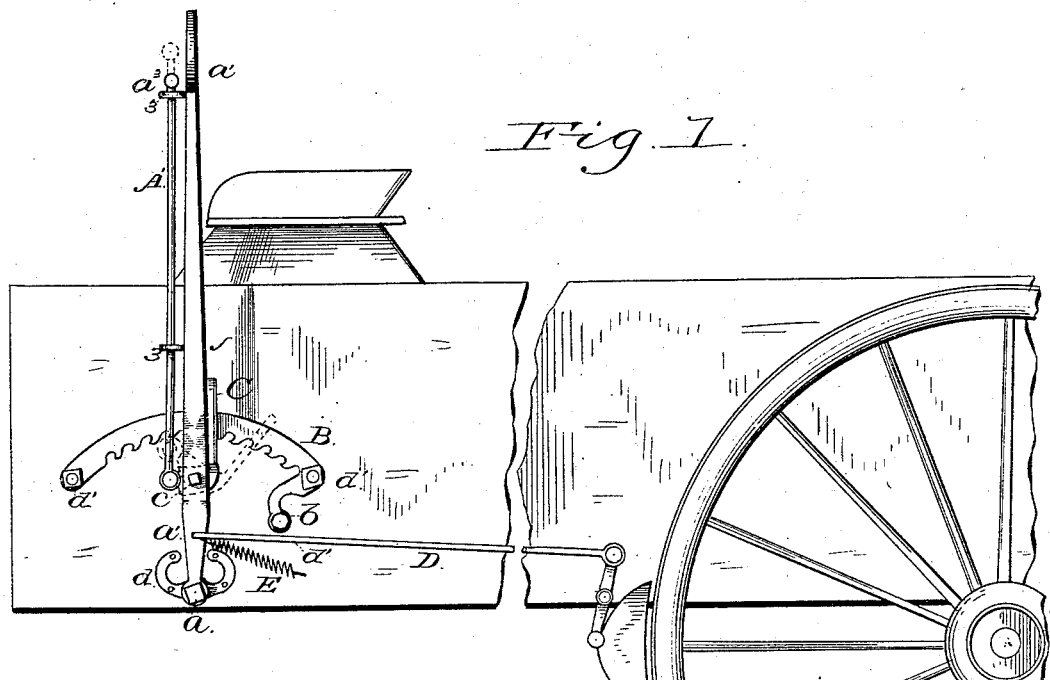
Figure 2:
Figure 3:
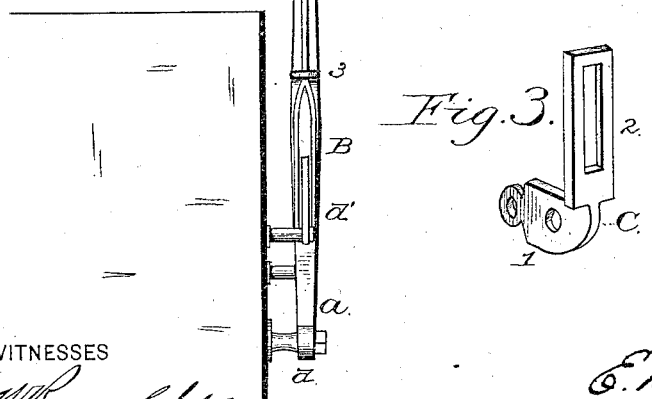

Referring to the annexed drawings, Figure 1 represents in side elevation a wagon having my improved brake-lock mechanism embodied in connection therewith. Fig. 2 is a vertical elevation of the device as it appears from an end view of the vehicle, and Fig. 3 is a view in detail of a certain portion thereof.

Reference being had to the several parts by the letters, A represents the main operating-lever, which constitutes a lever of the second class or order, its fulcrum being at $a$, the resistance taking place at the point $a'$, where the attachment or connection of the brake-rod is made, while the power is applied at the upper end or handle, $a''$. At a distance from the point of resistance equal to about that of the fulcrum the said lever is recessed or slotted out to form an opening, by which it can be placed upon and moved back and forth over a curved bar, B. This bar in shape conforms to the arc or segment of a circle, the direction of its curve being upward, and its under edge being notched or serrated, as shown.

Turning on a pivot, $c$, in the slot or opening of the lever A is a dog or detent, C, for locking or holding said lever against movement after the proper force has been applied to the brake. The said detent C consists of a solid portion, 1, through which the pivot $c$ passes, and an upwardly-extending portion or branch, 2, that is slotted for nearly the whole of its length to permit it to travel over the bar B, in like manner as lever A.

A' represents an auxiliary lever that is bifurcated at its lower end, and pivoted at such end to the outer end of the portion 1 of the dog or detent, as shown, and is held in position by guides 3 on the main lever, its lower bifurcated end embracing the arc-bar B, as shown. The lever A at its fulcrum is pivoted to a small post or standard, $d$, having a curvilinear base, by which much additional strength is afforded thereto. The bar B is secured to posts or standards $d'$ $d'$ $d'$, of the same height as $d$, so as to bring the said bar and the fulcrum of the main lever in the same vertical plane, the bar at one end being formed with a small branch, $b$, for lending strength thereto.

D represents the brake-rod, which is connected at one end to the main lever, and at the other end to a small lever which connects it with the brake-block D', such block and connection being of ordinary construction.

E represents a spring secured at one end to the side of the vehicle, and at the other to the lever A at the point of resistance. This spring serves, when the brake has been unlocked, to automatically and rapidly draw back the levers, thereby disengaging the blocks from contact with the wheels. The slotted portion 2 of the detent that embraces the notched bar B is of oblong shape, and when the main lever has been pushed forward and the auxiliary lever has been depressed to force the detent into engagement with said notched bar that part of such portion 2 which extends upwardly beyond the bar B will rest against the adjacent side of the main lever. In this manner the strain which tends to back movement of the main lever is not thrown entirely upon the portion of the detent that engages the notches of the bar, but is neutralized by the abutment of the upper portion, 2, of the detent and main lever.

The operation is as follows: When it is desired to cause frictional contact of the blocks with the wheels, the operator pushes forward the lever A, at the same time elevating the auxiliary lever A' to the position shown in dotted lines, Fig. 1. In thus elevating the lever A' the detent is also elevated at one end, its slotted portion being thrown down upon the upper or smooth edge of the arc-bar B. (See also dotted lines, Fig. 1.) When the parts are in these relative positions, the lever A can be pushed forward as far as desired, and to retain it at its down position the auxiliary lever is again pushed down to depress the detent and bring its slotted portion up against the side of the main lever, as shown in full lines, Fig. 1. This action causes the lower side of the portion 2 of the detent to go up into the notches or serrations of the bar B, and thus, as will be apparent, prevent any back movement.

Having thus described my invention, what I claim is—

In a brake mechanism for vehicles, the combination, with the bar B, having portion $b$, and the standards by which said bar is secured, of the slotted main lever moving on the bar and having fulcrum with enlarged base, the detent formed of the part 1 and the upwardly-extending oblong portion that embraces the bar, and the bifurcated auxiliary lever embracing the bar and pivoted to the portion 1 of the detent, substantially as set forth and described.

In testimony that I claim the foregoing as my own I affix my signature in presence of two witnesses.

E. B. C. WILLISON.

Witnesses:
W. S. DRAKE,
L. R. W. THOMPSON.